United States Patent
Lassanske

[15] 3,662,612
[45] May 16, 1972

[54] REVERSING TRANSMISSION

[72] Inventor: George G. Lassanske, Oconomowoc, Wis.
[73] Assignee: Outboard Marine Corporation, Waukegan, Ill.
[22] Filed: Aug. 24, 1967
[21] Appl. No.: 662,949

[52] U.S. Cl. .................................................74/355, 74/379
[51] Int. Cl. ...........................................................F16h 3/40
[58] Field of Search ..........................74/355, 379, 337.5, 404

[56] References Cited

UNITED STATES PATENTS

| | | | |
|---|---|---|---|
| 1,394,373 | 10/1921 | Tellefsen | 74/355 |
| 1,431,642 | 10/1922 | Farrar et al. | 74/355 |
| 1,704,896 | 3/1929 | Kizziar | 74/379 |
| 2,992,566 | 7/1961 | Walker | 74/355 |
| 3,119,277 | 1/1964 | Ziegler | 74/377.5 |
| 510,218 | 12/1893 | Ward | 74/379 X |
| 620,735 | 3/1899 | Cashmore | 74/379 |
| 851,448 | 4/1907 | Smith | 74/379 |
| 1,794,613 | 3/1931 | Heany | 192/46 X |

Primary Examiner—Carlton R. Croyle
Assistant Examiner—Thomas C. Perry
Attorney—Robert K. Gerling, Robert E. Clemency, John W. Michael, Gerrit D. Foster, Bayard H. Michael, Paul R. Puerner, Joseph A. Gemignani, Andrew O. Riteris and Spencer B. Michael

[57] ABSTRACT

Disclosed herein is a compact, lightweight shifting or transmission mechanism with co-axial input and output shafts with each shaft carrying a bevel gear. A clutch collar or clutch dog is splined or connected to the output shaft and has lugs which engage the bevel gear on the input shaft to transfer power from the input shaft to the output shaft. Reverse rotation of the output shaft relative to the input shaft and provision of a neutral condition is afforded by a third shaft which is perpendicular to the input and output shafts and which supports an idler gear movable into and out of engagement with the bevel gears in response to axial movement of the third shaft. When it is desired to obtain neutral, or to reverse the direction of rotation of the output shaft, initial movement of the third shaft toward the input and output shafts engages a cam surface at the end of the third shaft with a cam follower on the clutch dog to move to clutch dog axially out of engagement with the gear on the input shaft and thus to obtain a neutral condition by disconnecting the input and output shafts. Continued movement of the third shaft provides for engagement of the idler gear with the gears on the input and output shafts and results in power transfer through the idler gear.

5 Claims, 6 Drawing Figures

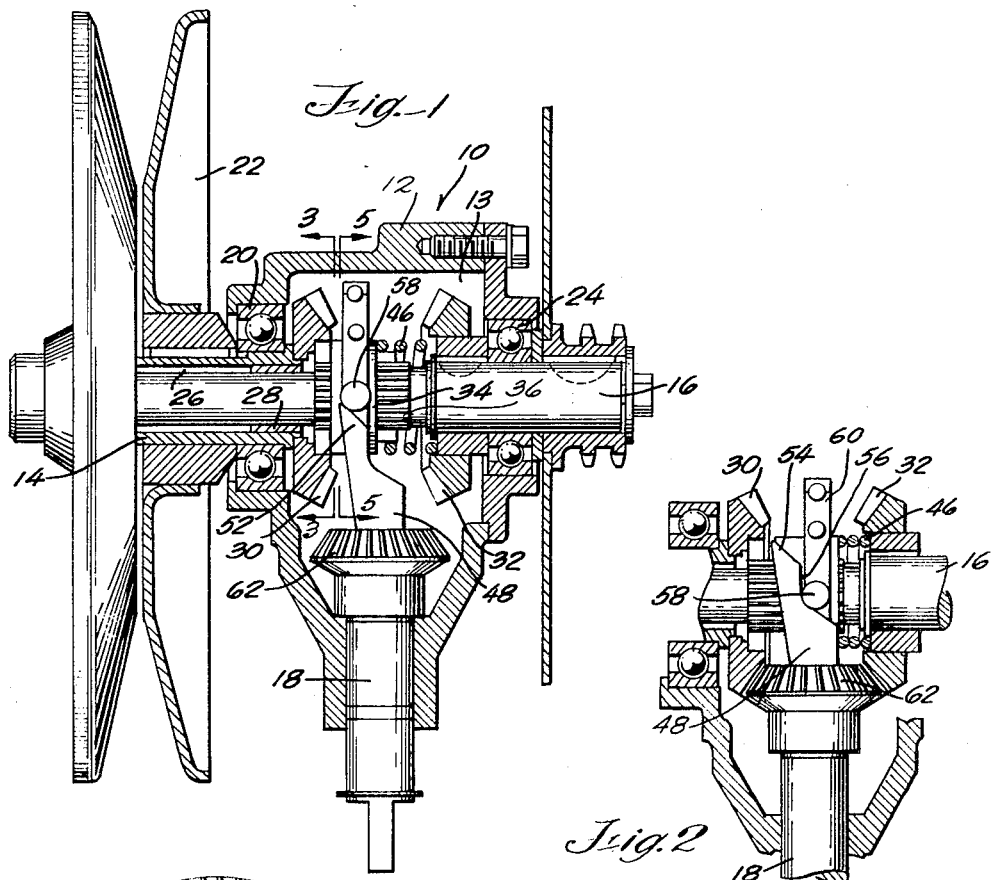
Fig. 1
Fig. 2
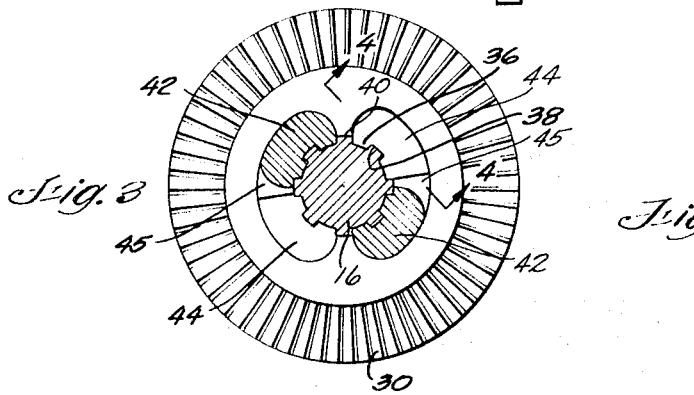
Fig. 3
Fig. 6
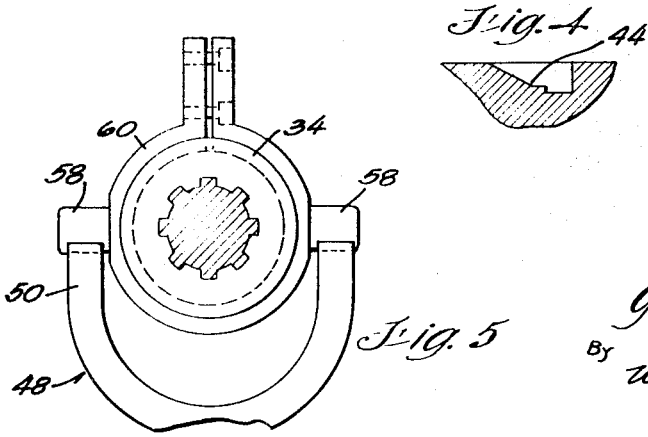
Fig. 5
Fig. 4
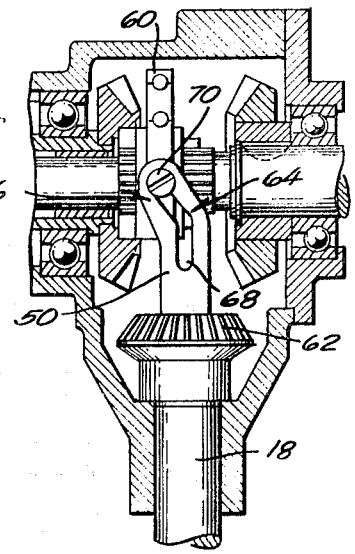
Inventor
George G. Lassanske
By Whyte, Whyte, Hoass & Clemency
Attorneys

3,662,612

REVERSING TRANSMISSION

SUMMARY OF INVENTION

The invention provides a compact, lightweight shifting or reversing mechanism particularly adapted for use where space requirements are critical, as for instance in a snowmobile, motorcycle, etc. The shifting mechanism includes first and second co-axial shafts with one of the shafts serving as an input shaft and the other as an output shaft, and a third shaft which can be perpendicular, inclined or parallel with respect to the input and output shafts and which rotatably supports an idler gear and functions as a shift rod. The input and output shafts each have opposed bevel gears secured thereto. The second shaft or output shaft has an axially movable clutch dog which is splined thereto and which is normally biased into engagement with the bevel gear on the first shaft to effect power transfer from the first shaft to the second shaft.

Reversal of the direction of rotation of the second shaft relative to the first shaft is effected by moving the third shaft toward the first and second shafts. The third shaft is provided with cam surfaces in engagement with cam followers on the clutch dog. Movement of the third shaft causes axial movement of the clutch dog, and disengages the clutch dog from the bevel gear on the first shaft providing a neutral condition. Continued movement of the third shaft causes the idler gear to engage both bevel gears and transfer power from the bevel gear on the first shaft to the bevel gear on the second shaft and thus reverse the direction of rotation of the second shaft. When the idler pinion is in engagement with the bevel gears the cam follower is located against a shoulder on the dog clutch to oppose movement of the clutch dog into engagement with the gear on the first shaft.

In a modified embodiment of the invention, the cam surfaces comprise slots in side legs of a yoke which is an extension on the third shaft.

Smooth engagement between the clutch dog and bevel gear is afforded by inclined ramps which are located in a recess at the side of the bevel gear adjacent the clutch dog and which receive the lugs of the clutch dog. The ramps in co-operation with the fit of the lugs in the recess or the pockets between the ramps minimize the "clunking" associated with shifting the clutch dog into and out of engagement, and also minimize backlash between the first and second shafts.

To minimize space, the second shaft extends within the hollow interior of the first shaft, which together with a sleeve bearing located within the first shaft interior furnishes support for one end of the second shaft.

Further objects and advantages of the present invention will become apparent from the following description and accompanying drawings.

DRAWINGS

FIG. 1 is a sectional view of a shifting mechanism in accordance with the invention, the mechanism being shown in forward drive condition.

FIG. 2 is a fragmentary sectional view of the gear shift mechanism shown in FIG. 1 with the components in a reverse drive condition.

FIG. 3 is a sectional view along line 3—3 of FIG. 1.

FIG. 4 is a sectional view along line 4—4 of FIG. 3.

FIG. 5 is an enlarged sectional view along line 5—5 of FIG. 1.

FIG. 6 is a fragmentary sectional view of a second embodiment of the present invention.

DETAILED DESCRIPTION

Referring to the drawings, FIG. 1 shows a gear shift mechanism which is generally designated 10 and which includes a gear case or housing 12 which defines a cavity 13. Extending within the cavity 13 is a first or input shaft 14, a coaxial second or output shaft 16, and a third or idler shaft 18 which in the disclosed construction is transverse or perpendicular to the input and output shafts 14 and 16 but which can be inclined or parallel with respect to shafts 14 and 16. The input shaft 14 is rotatably supported in gear case housing 12 by a bearing 20 and is driven by a pulley 22 or a gear or sprocket secured thereto which in turn is driven by the engine crankshaft (not shown).

One end of the output shaft 16 is rotatably supported in the housing 12 by a bearing 24. The other end of the shaft 16 extends into the hollow interior 26 of the shaft 14, which furnishes support therefor. A sleeve bearing 28 separates the output shaft 16 from the input shaft 14. The output shaft 16 can be independently supported without extending into the input shaft 14. However, the disclosed construction minimizes the size of the shift mechanism.

Located within the cavity 13 are first drive means comprising a bevel gear 30, and second drive means comprising a bevel gear 32. The bevel gear 30 is secured to the input shaft 14 and bevel gear 32 is secured to output shaft 16. Also located within the cavity 13 is clutch means comprising a shiftable clutch collar, or clutch dog 34 which is splined to the shaft 16 by splines 36 located in a bore 38 of the clutch dog 34. The splines 36 receive complementary splines 40 located on the exterior of the shaft 16.

Engagement of the clutch dog 34 with the bevel gear 30 is afforded by two lugs 42 which project from one end of the clutch dog and engage inclined ramps 44 (see FIG. 4) located within a recess or pocket 45 of bevel gear 30 to effect rotation of the shaft 16 with the shaft 14 when the clutch dog 34 is in a forward position. The use of ramps 44 in co-operation with the fit of the lugs 42 in the recess or pocket reduces the amount of backlash between the input and output shafts and also reduces "clunking" during engagement.

Means are provided in the form of a spring 46 to bias the clutch dog 34 axially into engagement with the bevel gear 30. The spring 46 is arranged around the shaft 16 and located between the clutch dog 34 and the gear 32.

In accordance with the invention, means are provided to shift or axially move the clutch dog 34 out of engagement with the bevel gear 30 and to afford power transfer from the bevel gear 30 to the bevel gear 32. In the embodiment illustrated in FIGS. 1, 2 and 5, such means includes a yoke 48 with side legs 50 having ends 52 with oblique cam surfaces 54 and stepped shoulders 56. Also included in such means are cam followers or posts 58 located on a clamp 60 which is secured to the clutch dog 34 as shown in FIG. 5 for axial movement therewith while affording rotary movement of the dog 34 relative to the clamp 60. A single leg 50 with a cam surface is within the purview of the invention. Power transfer from gear 30 to gear 32, as hereinafter described in detail, is afforded by an idler pinion or gear 62 which is rotatably supported on shaft 18. If a parallel idler shaft 18 is utilized, spur gears can be employed for gears 30, 32 and 62.

The gear shift mechanism of the present invention affords three modes or positions of operation, i.e., forward, neutral and reverse. Referring to FIG. 1, the clutch dog is shown in the forward position in engagement with the bevel gear 30. When the clutch dog is secured in this position under biasing means in the form of the spring 46, power transfer from the input shaft 14 occurs through the bevel gear 30 to the clutch dog 34 and to the output shaft 16 for rotation of the output shaft 16 in the same direction as the input shaft 14.

The neutral position is effected by initial movement of the third shaft or idler shaft 18 toward shafts 14 and 16. Such movement results in engagement and co-operation of the cam surfaces 54 on the legs 50 with the cam followers 58 of the clutch dog 34. Continued movement and pressure on the idler shaft 18 thus shifts the clutch dog 34 axially on the shaft 16 out of engagement with the bevel gear 30 and thus disengages the output shaft 16 from the input shaft 14.

The reverse position wherein the shaft 16 rotates in a direction reverse to the rotation of the input shaft 14 is effected by continued movement of the shaft 18 to position the cam followers 58 on the stepped shoulders 56 of the yoke legs 50, as shown in FIG. 2, and to engage idler gear 62 with the gears 30, 32 and thus effectuate power transfer from the shaft 14 to the shaft 16. Shoulders 56 retain the followers 58 and accordingly the clutch dog 34 against axial movement. To return to the neutral position, the shaft 18 is withdrawn to disengage the idler gear 62 from the bevel gears 30 and 32. The cam followers will then be located against shoulders 56 or the cam surfaces 54 depending on the extent of withdrawal. Further withdrawal will permit the return and release of the cam followers from the yoke 48 and will result in the clutch dog 34 returning to engagement with the gear 30 under biasing of the spring 46. The positions of neutral and reverse can be maintained by external detent means or an overcenter linkage (not shown) connected to the idler shaft 18.

A further embodiment of the invention is disclosed in FIG. 6 wherein the yoke 50 is provided with a cam slot 64 having an obliquely or angularly extending portion 66 and a perpendicular portion 68. In this embodiment, the cam followers can comprise bolts 70 threaded into the clamp 60 or threaded directly into the clutch dog 34. The angular or oblique section 66 of the slot 64 provides the cam surface for axially moving the clutch dog 34 out of engagement with the bevel gear 30 as the shaft 18 is moved axially toward the shafts 14 and 16. The perpendicular portion 68 retains the bolts 70 and thus the clutch dog 34 against axial movement.

In both embodiments, the shaft 18 can be provided with a single leg having a cam surface or slot to effect axial shifting of the clutch dog 34.

Various of the features of the invention are set forth in the following claims.

What is claimed is:

1. A shifting mechanism comprising a first rotatably supported shaft, first drive means on said first shaft, a second rotatably supported shaft, second drive means on said second shaft, clutch means non-rotatably mounted on and reciprocal axially of one of said first and second shafts independently of at least one of said first and second drive means, said clutch means being engageable with said drive means of the other of said first and second shafts to afford power transfer between said first shaft and said second shaft, said clutch means including a follower fixed thereon for reciprocating axial movement with said clutch means, a third shaft axially movable in a direction transverse to the axis of said one of said first and second shafts, said third shaft including a shoulder extending in a radial direction with respect to said one of said first and second shafts and spaced from the end of said third shaft, and a cam part located at the end of said third shaft and movable axially therewith and engageable with said follower to axially shift said clutch means relative to said first and second drive means in response to third shaft axial movement, and idler means rotatably supported on said third shaft, said idler means being engageable with said first and second drive means to afford power transfer between said first drive means and said second drive means and to thereby rotate said second shaft in a direction counter to said first shaft in response to said third shaft axial movement which affords disengagement of said clutch means from said other drive means.

2. A shifting mechanism comprising a first rotatably supported shaft, first drive means on said first shaft, a second rotatably supported shaft, second drive means on said second shaft, clutch means non-rotatably mounted on and reciprocal axially of one of said first and second shafts independently of said first and second drive means, said clutch means being engageable with said drive means of the other of said first and second shafts to afford power transfer between said first shaft and said second shaft, said clutch means including a follower fixed thereon for reciprocating axial movement with said clutch means, a third shaft axially movable in a direction transverse to the axis of said one of said first and second shafts, means on said third shaft including a yoke having side legs with cam slots, said cam slots having a portion perpendicular to said first and second shafts, and a portion oblique to said perpendicular portion, said yoke being movable axially with said third shaft for engaging said follower to axially shift said clutch means relative to said first and second drive means in response to third shaft axial movement, and idler means rotatably supported on said third shaft, said idler means being engageable with said first and second drive means to afford power transfer between said first drive means and said second drive means and to thereby rotate said second shaft in a direction counter to said first shaft in response to said third shaft axial movement which effects disengagement of said clutch means from said other drive means.

3. A shifting mechanism comprising a first rotatably supported shaft, first drive means on said first shaft, a second rotatably supported shaft, second drive means on said second shaft, clutch means non-rotatably mounted on and reciprocal axially of one of said first and second shafts independently of at least one of said first and second drive means, said clutch means being engageable with said drive means of the other of said first and second shafts to afford power transfer between said first shaft and said second shaft, said clutch means including a clamp secured to said clutch means for axial movement therewith and for relative rotation therebetween and a cam follower comprising a post projecting from said clamp, a third shaft axially movable in a direction transverse to the axis of said one of said first and second shafts, said third shaft including a cam part movable axially therewith and engageable with said follower to axially shift said clutch means relative to said first and second drive means in response to third shaft axial movement, and idler means rotatably supported on said third shaft, said idler means being engageable with said first and second drive means to afford power transfer between said first drive means and said second drive means and to thereby rotate said second shaft in a direction counter to said first shaft in response to said third shaft axial movement which affords disengagement of said clutch means from said other drive means.

4. A shifting mechanism comprising a first shaft, first drive means on said first shaft, a second shaft, second drive means on said second shaft, means rotatably supporting said first and second shafts, clutch means non-rotatably mounted on and reciprocal axially of one of said first and second shafts and including a cam follower, said clutch means being engageable with said drive means of the other of said first and second shafts to afford power transfer between said first shaft and said second shaft, and a third shaft movable axially, idler means carried by said third shaft, means defining a cam carried by said third shaft, said cam including first and second cam portions, said first cam portion and said cam follower cooperating to shift said clutch means axially so as to disengage said clutch means from said other drive means upon axial movement of said third shaft to engage said idler means with said first and second drive means to afford rotation of said second shaft in a direction counter to the direction of rotation of said first shaft, and said second cam portion cooperating with said cam follower to retain said clutch means against axial movement when said clutch means is disengaged.

5. A shifting mechanism comprising a first rotatably supported shaft, first drive means on said first shaft, a second rotatably supported shaft, second drive means on said second shaft, clutch means non-rotatably mounted on and reciprocal axially of one of said first and second shafts independently of at least one of said first and second drive means, said clutch means being engageable with said drive means of the other of said first and second shafts to afford power transfer between said first shaft and said second shaft, said clutch means including a follower fixed thereon for reciprocating axial movement with said clutch means, a third shaft axially movable in a direction transverse to the axis of said one of said first and second shafts, said third shaft including a cam part engageable with said follower to axially shift said clutch means relative to said first and second drive means in response to third shaft axial movement and a shoulder extending from said cam part in a radial direction with respect to said one of said first and second shafts and engageable with said follower to maintain said clutch means disengaged from said drive means of the other of said first and second shafts, and idler means rotatably supported on said third shaft, said idler means being engageable with said first and second drive means to afford power transfer between said first drive means and said second drive means and to thereby rotate said second shaft in a direction counter to said first shaft in response to said third shaft axial movement which affords disengagement of said clutch means from said drive means of the other of said first and second shafts.

* * * * *